KEY TOUCH REGULATING MECHANISM FOR TYPEWRITING MACHINES

Filed May 20, 1950 2 SHEETS--SHEET 1

AARON C. ZEAMER
INVENTOR

BY Theodore E. Simonton
ATTORNEY

KEY TOUCH REGULATING MECHANISM FOR TYPEWRITING MACHINES

Filed May 20, 1950 2 SHEETS--SHEET 2

AARON C. ZEAMER
INVENTOR

BY Theodore E. Simonton
ATTORNEY

Patented Jan. 6, 1953 2,624,439

UNITED STATES PATENT OFFICE 2,624,439

KEY TOUCH REGULATING MECHANISM FOR TYPEWRITING MACHINES

Aaron C. Zeamer, Groton, N. Y., assignor to L. C. Smith & Corona Typewriters, Inc., Syracuse, N. Y., a corporation of New York Application May 20, 1950, Serial No. 163,156

11 Claims. (Cl. 197—33)

The invention relates to key touch regulating mechanism for typewriting machines and is applicable to use in both key-operated and key-controlled typewriting machines for regulating the operating touch of one or more of the machine keys.

The general object of the invention is to provide an improved key touch regulating means of simple and inexpensive construction which readily may be applied to typewriting machines of widely variant constructions and may be readily set or adjusted to regulate the key touch to suit the desires of individual typists.

A specific purpose of the invention is to provide a key touch regulating mechanism of the character above set forth whereby the operating touches of all of the character keys of a typewriting machine may be varied uniformly and collectively by a typist by variably delayed stretching of a touch regulating spring and in which the delayed stretching of the spring is started smoothly and silently without impact of parts and undesirable reaction shocks on the typist's fingers.

Another specific purpose of the invention is to provide a selectively settable key touch regulating mechanism which effects a delayed and selectively variable yielding resistance to completion of manual strokes of a key by first straightening and then elongating a yieldingly extensible toggle during manual strokes of the key.

A further specific purpose of the invention is to provide for collectively regulating the touch of the character keys of a typewriting machine by controlling the stretching of a toggle which is yieldingly stretchable while straightened and is drivable in toggle straightening and stretching direction by each character key on manually imparted strokes of the key.

Other purposes and advantages of the invention will appear from the following detailed description with reference to the accompanying drawings.

Figure 1:
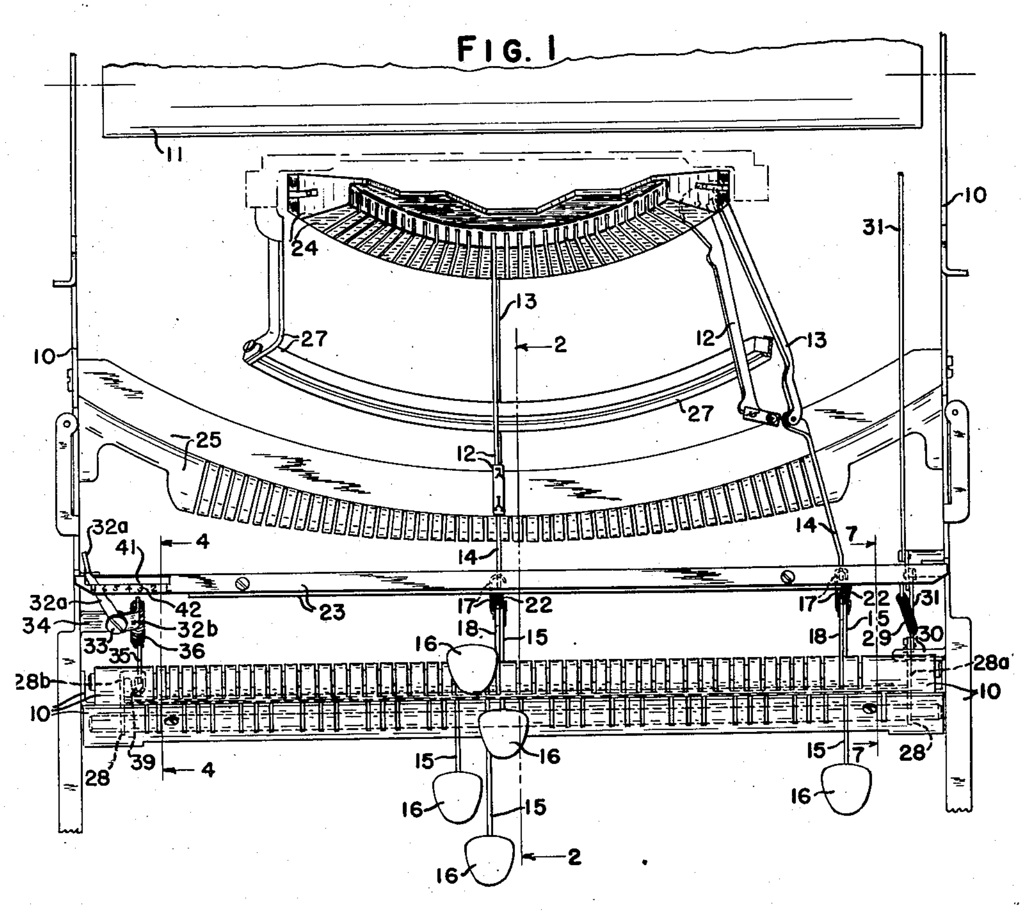
Figure 1 is a fragmentary plan view of a known typewriting machine having a set of key-operated type actions and equipped with a mechanism embodying the invention for regulating the operating touch of the operating keys of its type actions, the type actions being shown in normal idle position with the touch regulating mechanism set at its limit of adjustment for heaviest key touch.
Figure 2:
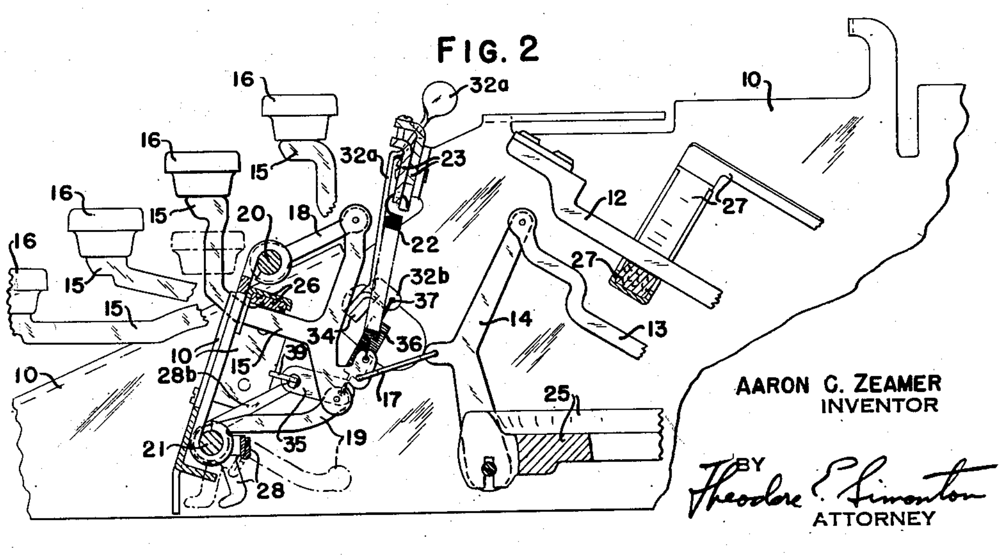
Figure 2 is a sectional view on the line 2—2 of Figure 1.
Figures 3, 4, 5, 6, 7, 8, 9, 10:
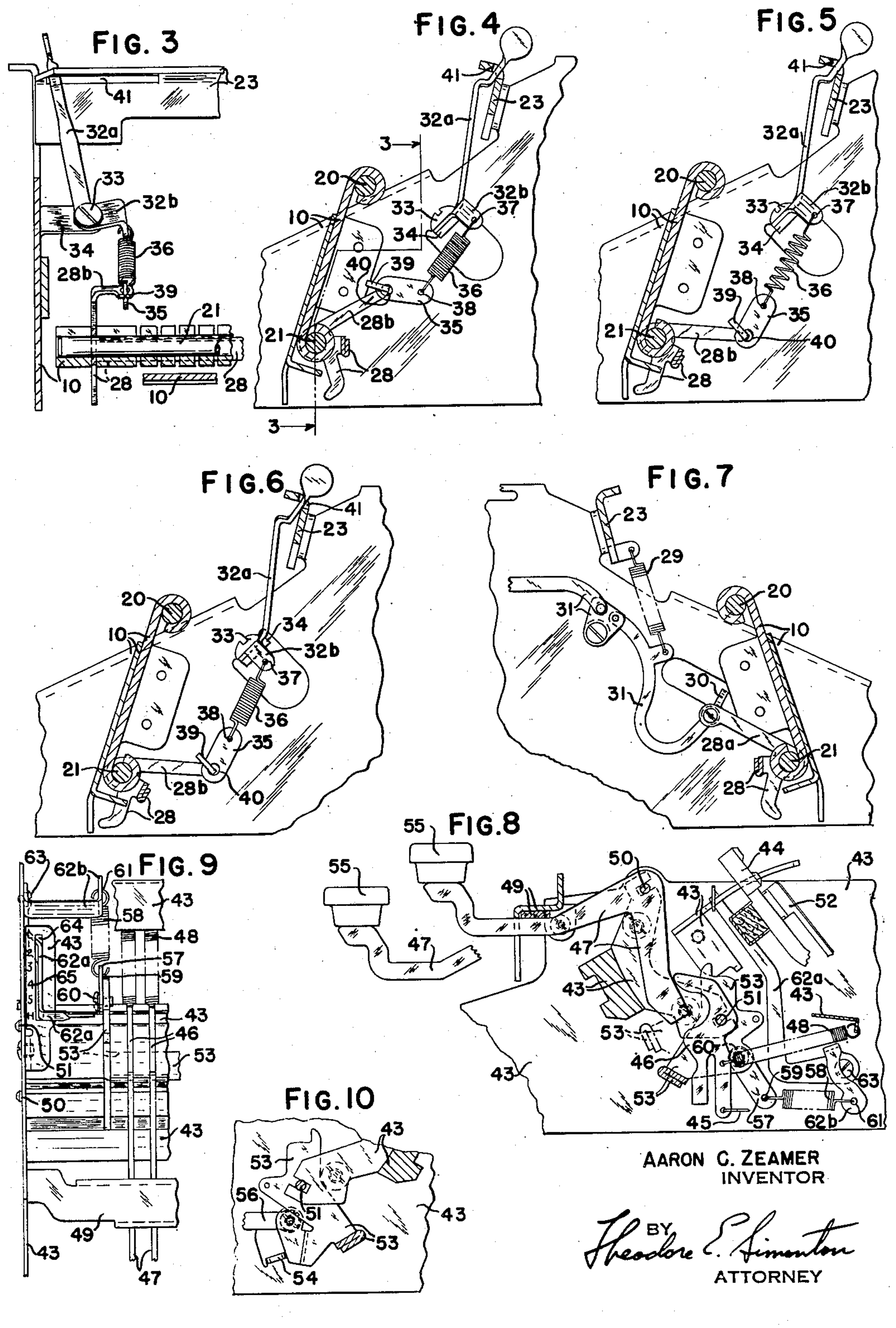
Figure 3 is a detail sectional view on the line 3—3 of Figure 4.
Figure 4 is a detail sectional view on the line 4—4 of Figure 1, with certain parts omitted for clarity of illustration of certain features of the invention.
Figure 5 is a view similar to Figure 4 but showing the condition of the touch regulating mechanism at the limit of manual depression of the type action keys.
Figure 6 is a view similar to Figure 5 but showing the touch regulating mechanism at its limit of adjustment for light touch and in the condition thereof at the limit of manual key depression.
Figure 7 is a detail sectional view on the line 7—7 of Figure 1.

Figure 8 is a view similar to Figure 2 showing a modified form of touch regulating mechanism embodying the invention and incorporated in a second known form of typewriting machine for regulating the operating touch of the keys of the key-operated type actions of that machine, the type actions and touch regulating mechanism being shown in normal idle condition with the touch regulating mechanism set at its limit of adjustment for heaviest key touch;

Figure 9 is a fragmentary top plan view of said second machine showing features of the modified touch regulating mechanism; and Figure 10 is a view similar to Figure 7 showing features of the modified touch regulating mechanism.

The invention as it is illustrated in Figures 1 to 7, embodied in an otherwise known machine, first will be described. Only so much of the known machine will be described as is necessary to enable those skilled in the art to understand the present invention.

In the known machine a set of individually operable and key-operated type actions are mounted on the stationary or main frame or framework 10 of the machine for typing on paper backed by the platen 11 of the machine. Each type action comprises a type bar 12, a pull link 13 one end of which is connected to the heel of the type bar, an upstanding sub-lever 14 to the upper end of which the other end of the pull link is connected, a key stem 15 carrying a manually depressible character key 16 at its upper end, a link 17 connecting the sub-lever and key stem of the action, a pair of superposed links 18 and 19 pivotally connected at their rear ends at different vertical levels to the key stem of the action and pivotally held at their forward ends to parallel pivot rods 20 and 21 which extend horizontally across the machine main frame at different levels and are held to said frame, and a type action return spring 22 anchored at its opposite ends respectively to the key stem 15 and to a spring anchor bar device 23 which extends horizontally across the main frame 10 and is held thereto.

The several type bars of the set of type actions are pivoted in a type bar segment 24 supported in the main frame of the machine, and the several sub-levers 14 of the set of type actions are pivoted at their lower ends in a segment 25 fixedly held to the main frame 10 and forming a part thereof.

The springs 22 normally retract or return the type actions to engage the key stems under a return stop bar device 26 which extends horizontally across the machine and is fixedly held to the main framework 10. A type bar rest device 27 (shown in part) is mounted in the machine frame 10 to support the type bars in the retracted positions of the several type actions.

The machine is provided with a sheet metal and bail-like key-operated universal bar 28 the side arms of which are pivoted on rod 21 and the horizontal crossbar of which underlies all of the lowermost key stem supporting links 19 of the set of type actions. This universal bar is swung downwardly and forwardly about rod 21 through an arc of fixed extent by depression of any one of the type keys, being driven through this arc by the link 19 of the type action operated by the depressed key.

Universal bar 28 is biased by a return spring 29 to a normal position in which it is arrested, the arresting or return stop means shown for said universal bar being a stop lug 30 formed on the main frame. The crossbar of the universal bar is normally spaced a small fraction of an inch below the universal bar driving links 19 of the set of type actions. At its right hand end the universal bar is provided with an operating arm 28ª for a linkage system (shown in part at 31) for operating certain known parts of the machine through the medium of the type actions. The return spring 29 is connected to this linkage system and to the anchor bar device 23 to return the universal bar to its normal position on the return strokes of the type actions and engage arm 28ª under stop lug 30. The universal bar 28 forms a part of the improved touch regulating mechanism in the embodiment of the invention shown in Figures 1 to 7, and said mechanism now will be described.

At its left hand end the universal bar 28 is formed with a toggle anchoring arm 28ᵇ which normally extends upward and rearward from the pivotal axis of the universal bar toward a second toggle anchoring arm 32ᵇ which forms one arm of a manually settable touch regulating hand lever of bellcrank form, which lever has an upstanding handle arm 32ª. The touch regulating lever is pivotally held by a pivot screw 33 to a supporting lug 34 formed on the main frame 10 for rocking adjustment of arm 32ᵇ toward and from the universal bar with said lever arm 32ᵇ located above and rearward of the rear end of arm 28ᵇ of the universal bar.

A touch regulating toggle consisting of two links 35 and 36 is pivotally or hingedly anchored at its opposite ends to the adjacent free ends of the arms 28ᵇ and 32ᵇ with the links 35 and 36 pivotally or hingedly jointed at their adjacent ends. The toggle is normally suspended from and between its anchorages in a folded, collapsed or downwardly sagging condition into which it is urged by return movement of the universal bar and also by the action of gravity on the toggle. The toggle is a pull toggle which is elastically or resiliently elongative or stretchable by endwise pull thereon while unfolded into fully straightened condition and, for permitting such elongation or stretching, preferably consists of a rigid link and a resiliently or elastically elongative or stretchable link. In the construction shown, the toggle link 35 is a rigid sheet metal link and the toggle link 36 is a helical spring link which is resiliently axially or longitudinally stretchable. The spring link 36 has its ends pivoted in pivot holes 37 and 38 in the anchor arm 32ᵇ and the link 35. The arm 28ᵇ has a split eye 39 extending through a pivot hole 40 in the rigid sheet metal link 35 to pivotally anchor link 35 to arm 28ᵇ of the universal bar.

In Figures 1 to 5 of the drawings the variably settable toggle anchor lever 32ª—32ᵇ is shown at its limit of adjustment for heaviest key touch. The settable lever is a sheet metal lever the handle arm 32ª of which extends through and is manually movable along a closed slot 41 formed in the main frame bar 23. Suitable touch indicating indicia 42 are provided on the bar 23 for coaction with arm 32ª of the settable lever, the indicia "H" and "L" indicating, respectively, the limit adjustments of the lever for heaviness and lightness of touch and the intermediate indicia indicating positions for intermediate touch regulating adjustments of the lever. Lever arm 32ª is spring tempered to frictionally bear (as best shown in Figures 4, 5, and 6) firmly against the rear edge of slot 41 and frictionally hold the lever 32ª—32ᵇ in whatever position it is adjusted or set and prevent accidental rocking of the lever by pull thereon of the toggle 35—36.

Preferably, and in the construction shown, the limits of adjustment or setting of lever 32ª—32ᵇ are such that on each manual or depression stroke of any key 16 the universal bar 28 will first fully straighten the pull toggle 35—36 and then elastically or resiliently stretch or elongate the straightened toggle in all set positions of lever 32ª—32ᵇ except the light touch limit of setting. In this latter setting, as shown in Figure 6, the universal bar at the limit position to which it is drivable by manual key depression merely fully straightens the toggle without stretching it.

In Figures 8 to 10 a modified form of the touch regulating mechanism is shown as embodied in another known typewriting machine and now will be described.

The type actions and the touch controlling mechanism (including a key operated universal bar) are mounted in the stationary main framework 43 of the machine. Each type action includes a type bar 44, a type bar pull link 45, a sub-lever 46 connected to the type bar by the pull link, a bellcrank key lever 47 engaged with the sub-lever, and a type action return spring 48 which is connected with the sub-lever and main framework and normally holds the key lever returned to a key lever stop bar device 49 held to the main framework. The key levers are fulcrumed on a pivot rod 50 held to the main frame, and the sub-levers are fulcrumed on a pivot rod 51 held to the main frame. The type bars are normally retracted to a type bar rest 52. A sheet metal and bail-like universal bar 53 has its side arms pivoted on rod 51 and is normally biased by gravity to the returned position shown in full lines in Figures 8 and 9 in which it is arrested by a stop lug 54 (Figure 10) on the main frame by engagement of the right hand side arm of the universal bar with said lug. The horizontal cross bar of the universal bar is normally spaced a small fraction of an inch from the sub-levers and, by each full down stroke of any of the character keys 55 on the key levers, is driven by the actuated sub-lever into the position shown in dotted lines in Figure 8 to actuate through a link 56 (Figure 10) certain known mechanisms of the machine and also to act on the pull toggle 57—58 of the improved modified touch control mechanism embodying the present invention.

The toggle 57—58 is suspended between two anchorages and is normally folded. The toggle consists of a rigid sheet metal link 57 and helical spring link 58 which are pivotally jointed or hinged together at 59 with the link 57 anchored to the left hand side arm of universal bar 52 by a pivot 60 and with the link 58 pivotally anchored at 61 to a variably settable toggle anchor arm $62^b$ of a manually settable sheet metal lever $62^a$—$62^b$. Said lever is pivotally held by a pivot screw 63 to the main framework for rocking adjustment or setting of arm $62^b$ of the lever toward and from the universal bar and the toggle anchor pivot 60. The handle arm $62^a$ of lever $62^a$—$62^b$ extends upwardly through a closed slot 64 in a part of the stationary framework of the machine.

The handle arm $62^a$ is spring tempered and constantly stressed to frictionally bear (as shown in Figure 9) on the right hand side edge of slot 64 to hold the lever in any set position against rocking movement by pull of toggle 57—58 thereon. Indicia 65 for facilitating desired settings of lever $62^a$—$62^b$ are provided on the main frame for coaction with handle arm $62^a$. The lever is shown set at its position for heaviest key touch, and the limit of adjustment for lightest key touch is such, as in the construction shown in Figures 1 to 7, that the toggle will merely straighten without elastically stretching at the limit of key depression.

The mode of operation of the two illustrated forms of touch control mechanism is believed to be obvious from the foregoing detailed descriptions of said mechanisms. Upon full operating depression of any character key to drive the connected type bar to printing position the universal bar is driven a fixed and at least substantially constant extent which is sufficient to straighten the downwardly folded or sagging toggle and, in all adjustments or settings of the touch regulating lever except that for lightest touch, is also sufficient to elastically or resiliently elongate or stretch the toggle during a final part of the key depression which varies in extent in accordance with variable adjustment of the lever toward its setting for heaviest key touch. The extent to which the toggle is folded or collapsed increases as the setting lever is variably adjusted toward its setting for lightest touch. The toggle is thus settable so that the spring link begins to stretch at different selected points in the manually imparted or depression strokes of a key.

The toggle in both constructions is positively anchored at its ends and is suspended from and between its anchorages to fold or sag downward in the normal returned position of the key or keys the touch of which is regulated by the toggle.

A resiliently extensible and normally slack tie is thus provided which is positively anchored at opposite ends of the tie to a key driven member and a settable member, which tie will gradually and smoothly first be pulled into a straightened taut condition and then be variably resiliently extended during key driving of the key driven member which acts to pull on one end of the tie, the extent of resilient extension of the tie and the point at which said extension begins being controlled by the setting of the settable member. A smooth transition from straightening or tautening to resilient stretching action on the tie is effected which avoids noisy impaction of parts in starting the imposition of the spring stressing action and also avoids sudden abrupt reaction on the typist's fingers as the spring resistance starts.

A preferred and a modified embodiment of the invention have been shown and described, by the way of example, but it is to be understood that changes may be made by those skilled in the art without departing from the invention and I wish, therefore, to be limited as to the scope of the invention only by the appended claims.

I claim:

1. A typewriting machine having, in combination, a part-controlling key mounted for manual and return strokes, a touch regulating toggle for said key which is resiliently elongative while straightened, a key drivable anchorage and a stationary anchorage for said toggle relatively movable at the key strokes to impart unfolding and folding movements to said toggle in response respectively to manual and return strokes of said key, and means for relatively adjusting said anchorages to support said toggle for unfolding thereof into a fully straightened condition at different selected points in the manual key strokes and for variable resilient elongation of the toggle to yieldingly resist completion of such strokes.

2. A typewriting machine, as claimed in claim 1, wherein the stationary toggle anchorage is adjustably settable on a stationary part of the machine to vary the point in the manual key strokes at which the toggle straightens, and wherein the key drivable toggle anchorage is mounted and biased to move to a normal position from which it is drivable by said key to unfold the toggle on the manual strokes of the key.

3. A typewritting machine having, in combination, manually depressible part-controlling keys, a touch regulating toggle for said keys which is resiliently extensible, toggle folding and unfolding means common to all of said keys and responsive to depression of individual ones of said keys to unfold said toggle, and means to condition said toggle folding and unfolding means at will to first fully unfold and then resiliently extend the toggle a selected extent as each key is depressed.

4. A typewriting machine having, in combination, manually depressible operating keys, a touch regulating toggle for said keys which is resiliently elongative, and means settable to normally fold said toggle a selected extent and responsive to depression of individual ones of said keys to first fully unfold and then resiliently elongate the toggle.

5. A typewriting machine having, in combination, individually actuative key-operated type actions movable through typing and return strokes, a resiliently stretchable touch controlling toggle for the type actions, a universal bar drivable by the type actions on their typing strokes and biased to return to a normal position on the return strokes of the type actions and anchoring one end of the toggle to unfold and fold the toggle respectively on the typing and return strokes of said type actions, and an anchor element for the other end of the toggle variably settable relatively to the universal bar to condition said toggle for resilient stretching thereof by said universal bar through final portions of desired extent of the typing strokes of the type actions to vary the operating touch of all of the type actions uniformly in accordance with the setting of said anchor element.

6. A typewriting machine, as claimed in claim 5, wherein said settable anchor element for the toggle comprises a hand lever to which said other end of the toggle is anchored and which is rockably adjustable on a stationary part of the machine into different set positions thereof.

7. A typewriting machine, as claimed in claim 5, wherein said toggle has a rigid link and a resiliently stretchable link which are pivotally connected, one of which links is pivotally anchored to the universal bar and the other one of which is pivotally anchored to said settable anchor element.

8. A typewriting machine, as claimed in claim 7, wherein the resiliently stretchable link of the toggle is a longitudinally stretchable helical spring.

9. A typewriting machine having, in combination, manually depressible part-controlling keys, a touch regulating toggle for said keys having a rigid link and a resiliently longitudinally extensible link which are hinged together, folding and unfolding means for said toggle responsive to depression of each key to unfold said toggle and normally supporting the toggle in folded condition, and means to at will condition said toggle folding and unfolding means to first fully unfold and finally resiliently extend the toggle a selected extent as each key is depressed.

10. A typewriting machine, as claimed in claim 9, wherein said toggle folding and unfolding means comprises a pivotally mounted universal bar anchoring one link of the toggle and drivable by depression of individual ones of said keys from a normal position to which said bar is biased to return, and a pivoted anchoring arm for the other end of the toggle manually rockable toward and from the universal bar by said conditioning means into selectively set positions.

11. A typewriting machine having a touch regulating mechanism for a set of operating keys thereof comprising, in combination, a touch regulating spring, a variably settable anchor member for one end of said spring to which said spring end is positively connected, a universal bar drivable from a normal limit to a protracted limit by manual strokes of each of said keys and biased to return to its normal limit, and a spring stressing and relaxing pull tie extending between and positively connected to said universal bar and the other end of said spring to form with said spring a normally relaxed tie between the universal bar and said anchor member which first tautens and then resiliently resists driving of said universal bar in the course of depression of each of said keys.

AARON C. ZEAMER.

REFERENCES CITED

The following references are of record in the file of this patent:

UNITED STATES PATENTS

| Number | Name | Date |
|---|---|---|
| 831,511 | Hess et al. | Sept. 18, 1906 |
| 894,497 | Hess | July 28, 1908 |
| 1,053,065 | Ronchetti | Feb. 11, 1913 |
| 1,476,511 | Hess | Dec. 4, 1923 |